(12) United States Patent
Habel

(10) Patent No.: US 7,448,978 B2
(45) Date of Patent: Nov. 11, 2008

(54) DIFFERENTIAL FOR AN ELECTRICALLY POWERED DRIVING AXLE

(75) Inventor: Matthias Habel, Gotha (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 263 days.

(21) Appl. No.: 11/405,115

(22) Filed: Apr. 17, 2006

(65) Prior Publication Data
US 2006/0240931 A1    Oct. 26, 2006

(30) Foreign Application Priority Data
Apr. 22, 2005   (DE) .................. 10 2005 018 907

(51) Int. Cl.
*F16H 48/06*   (2006.01)
*F16H 37/08*   (2006.01)
(52) U.S. Cl. .................. 475/230; 475/231; 475/205
(58) Field of Classification Search .................. 475/150, 475/154, 155, 157, 231, 230, 243, 233, 237–9, 475/323, 326–28, 311, 314–16, 204, 205; 192/218, 219.4, 219.6, 48.3, 48.5, 49
See application file for complete search history.

(56) References Cited

U.S. PATENT DOCUMENTS 3,315,757 A * 4/1967 Gunther .................. 180/340
5,295,921 A * 3/1994 Ippolito et al. .............. 475/238
6,332,504 B1 * 12/2001 Adds ......................... 180/65.2
6,827,663 B2 * 12/2004 Tucker-Peake .............. 475/231
6,830,530 B2   12/2004 Perkins et al.

FOREIGN PATENT DOCUMENTS

| DE | 36 17 074 A1 | 11/1987 |
| DE | 38 13 528 A1 | 11/1988 |
| DE | 39 35 115 A1 | 5/1990 |
| DE | 200 10 563 U1 | 11/2000 |
| DE | 103 44 556 A1 | 6/2004 |
| DE | 203 10 256 U1 | 12/2004 |
| DE | 103 27 458 A1 | 1/2005 |
| JP | 406200992 A * | 7/1994 |

OTHER PUBLICATIONS

EPE english translation of DE3813528, Mar. 25, 2008, htt://www.worldlingo.com/wl/epo/epo.html.*

* cited by examiner

*Primary Examiner*—Roger Pang
(74) *Attorney, Agent, or Firm*—Davis Bujold & Daniels, P.L.L.C.

(57) ABSTRACT

To brake a drive output shafts (5) of an electrically powered driving axle, the differential comprises a brake (6) which, when actuated, connects a differential cage (2) and the drive output shaft (5) with a flange (23).

20 Claims, 3 Drawing Sheets

DIFFERENTIAL FOR AN ELECTRICALLY POWERED DRIVING AXLE

This application claims priority from German Application Serial No. 10 2005 018 907.5 filed Apr. 22, 2005.

FIELD OF THE INVENTION

The present invention concerns a differential for an electrically powered driving axle.

BACKGROUND OF THE INVENTION

DE 200 10 563 U1 discloses an electrically powered, driving axle with a differential in which the electric drive motor drives the differential cage via a planetary gearset and the drive output shafts drive the driving wheels each via a planetary gearset. In the area of these planetary gearsets, a brake is arranged in each case and these brake the drive output shaft close to the wheels.

The purpose of the present invention is to provide a differential, in particular for an electrically powered, driving axle, which is made so that it can be braked and whose structure is simple.

SUMMARY OF THE INVENTION

According to the invention, the differential cage of the differential is driven, whereby the axle shaft gear wheels of the differential are driven by the differential gear wheels. The differential comprises a brake with rotating and static disks, at least one rotating disk being connected to the differential cage and at least one other rotating disk to the axle shaft, gear wheel. The static disk is connected to the housing of the differential. If the brake is actuated now in the closing direction, the differential cage and the axle shaft, gear wheel are braked relative to the differential housing. It is, therefore, possible to brake the vehicle completely with only one brake and also keep it braked on ground surfaces with various frictions, which is not normally possible with only one braked vehicle wheel and a differential, because the second vehicle wheel has not been braked by the differential.

In another embodiment, the brake comprises an actuator for an operating brake and an actuator for a parking brake. The actuator for the operating brake can be made as a positively acting, hydraulically actuated, working brake, such that it is moved in the closing direction when pressurized, while the parking brake is made as a mechanically applied brake actuated, for example by a cable and a manual brake lever. It is also possible to make the operating brake and/or the parking brake as a negative brake such that, for example, a spring engages the brake when it is not pressurized, while pressurizing the brake moves it in the release direction.

In a further embodiment, the brake can be actuated, via a ball ramp. The ball ramp consists of at least one fixed and one rotating component, such that when the latter is rotated by the ball ramp this actuator is enlarged in the axial direction, whereby the brake is moved in the closing direction. The rotating component can be turned, for example, by a hydraulic cylinder for the operating brake and by a twist-stud for the parking brake.

In another embodiment, the differential can be made with differential gears formed as bevel gears and axle shaft gears also formed as bevel gears, but the differential can also be made as a planetary differential.

In a further embodiment, the differential cage is in active connection with a ring gear. The ring gear is driven by a drive pinion that is in direct active connection with the electric motor. This enables the electric motor to be flanged on the differential housing so that the electric motor is at right-angles to the drive output shafts. That makes it possible to provide the differential housing with a large opening through which the complete, pre-assembled, structural unit "differential with brake" can be inserted into the differential housing. Then only the drive output shafts, which can be made for example as plug-in shafts, are inserted. This simplifies assembly considerably.

In another embodiment, the parking brake has a forked brake lever such that the ends of the fork press against a pressure plate of the brake in order to actuate the brake in its closing direction. The forks are arranged on a rotating stud which can be turned with the aid of a lever and the brake cable.

In a further embodiment of the invention, several hydraulic pistons are arranged between the ring gear and the disks. These hydraulic pistons are distributed uniformly around the periphery of the disks and, when pressurized, actuating the brake in the closing direction as an operating brake.

BRIEF DESCRIPTION OF THE DRAWINGS

The invention will now be described, by way of example, with reference to the accompanying drawings in which.

DETAILED DESCRIPTION OF THE INVENTION

Figure 1:
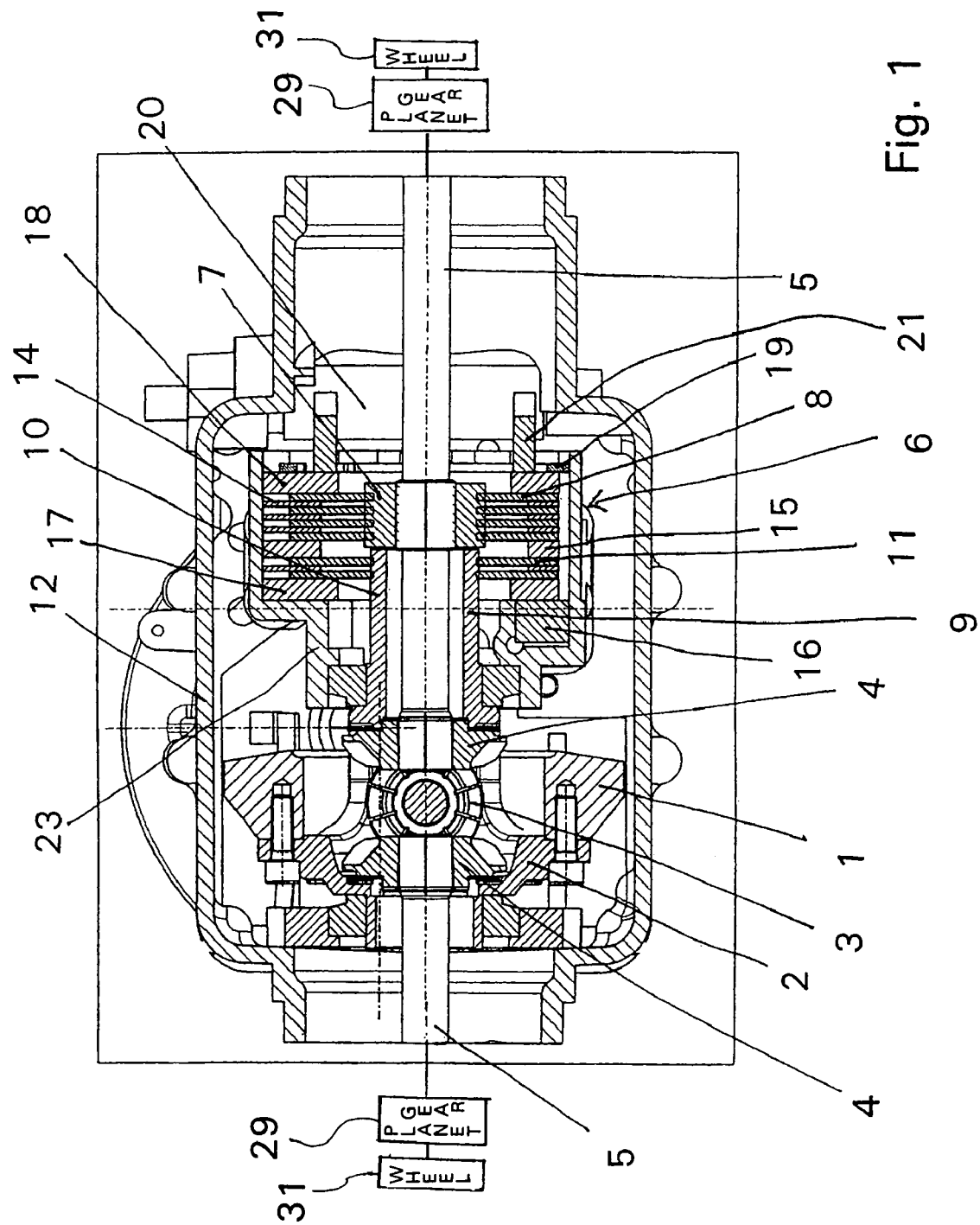
FIG. 1 is a section through the differential.

FIG. 1:

A driven ring gear 1 is in rotationally fixed connection with a differential cage 2, which drives drive output bevel gears 4, via differential bevel gears 3. The drive output bevel gears 4 are in rotationally fixed connection with drive output shafts 5. The drive output shafts 5 can drive vehicle wheels 31, for example via a planet gear 29. In the area a brake 6, the drive output shaft 5 comprises an inner disk carrier 7, which is in rotationally fixed connection with inner disks 8. The differential cage 2 has a neck 9 which, in the area of the brake 6, is formed as an inner disk carrier 10 and is in rotationally fixed connection with inner disks 11. The neck 9 can be connected to the differential cage as one piece or in more than one piece. In the area of the brake 6, a differential housing 12 is formed as an outer disk carrier 13 and is in rotationally fixed connection with outer disks 14. Between the inner disks 8 and the inner disks 11 is arranged a plate 15. Uniformly around the periphery of the inner disks 11 are arranged pistons 16 which, when pressurized, press against a pressure plate 17 and fully actuate the brake 6 in the closing direction since a pressure plate 18 rests via a locking ring 19 against the brake 6. Thus, by pressurizing the pistons 16, the operating brake is realized, whereby the brake 6 connects both the differential cage 2 and the drive output shaft 5 with a flange 23 so that both drive output shafts 5 are braked. When the parking brake 27 is actuated, a shaft 20 is rotated mechanically, for example by actuating a manual brake lever and the cable connected thereto, whereby forks 21 press against the pressure plate 18 and the brake 6 is moved in the closing direction.

FIG. 2:

The drive pinion 22 drives the ring gear 1. The drive pinion 22 is mounted in a flange 23 that can be connected directly to the electric motor. The electric motor is, therefore, at right-angles to the drive output shafts 5. In the area of the flange 23, the differential housing 12 has an opening large enough for the complete pre-assembled differential with the brake to be attached to the flange 23 and introduced through the opening in the differential housing 12 into the housing. The rotary shaft 20 of the parking brake 27 and the forks 21 can already be fitted in the differential housing 12 already before joining together. When the operating brake is actuated, the pistons 16 press against the pressure plate 17.

Figure 2:
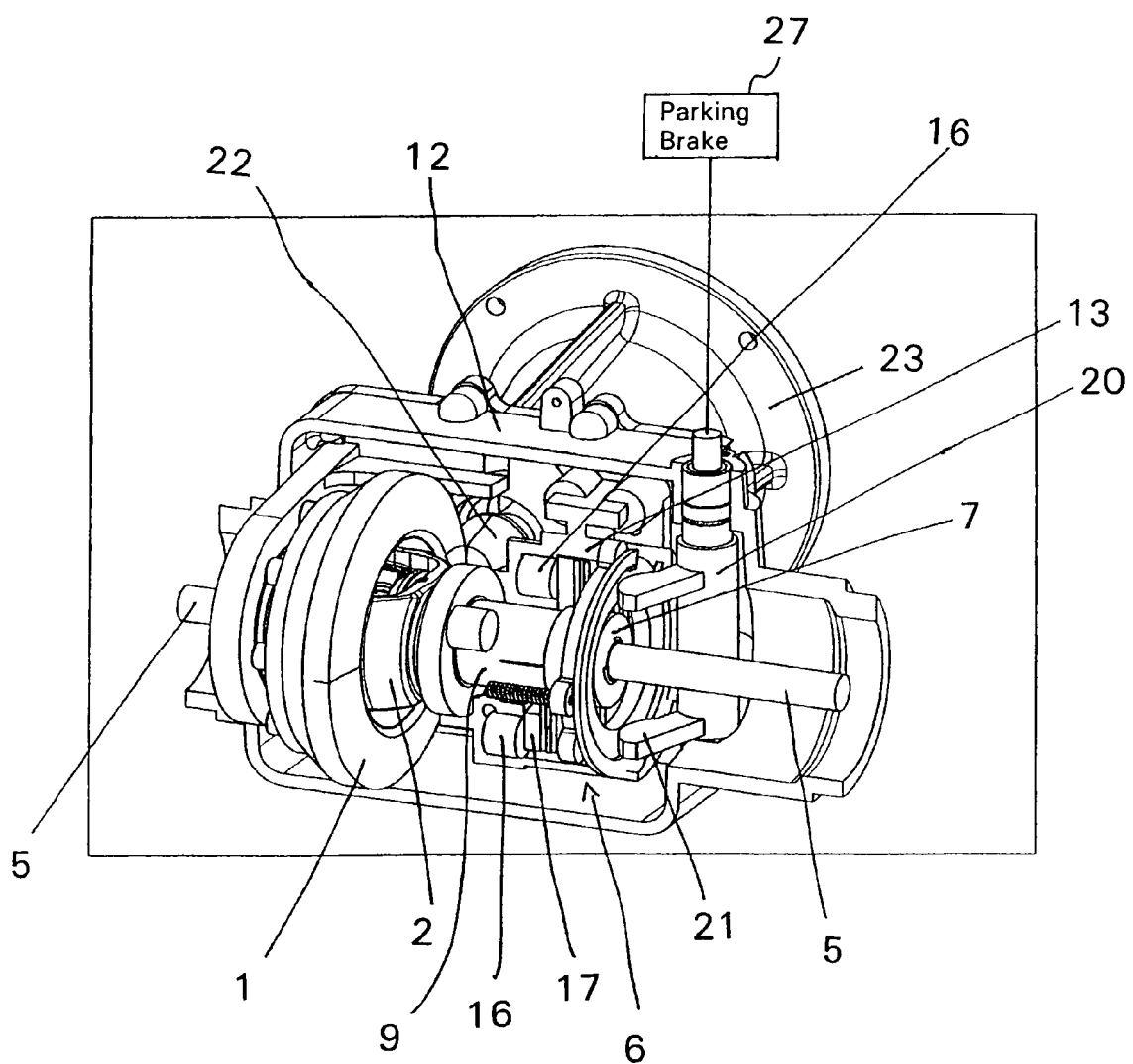
FIG. 2 is a perspective view of the assembled differential with cutaway differential housing and actuation of the operating brake by way of pistons that can be hydraulically pressurized.
Figure 3:
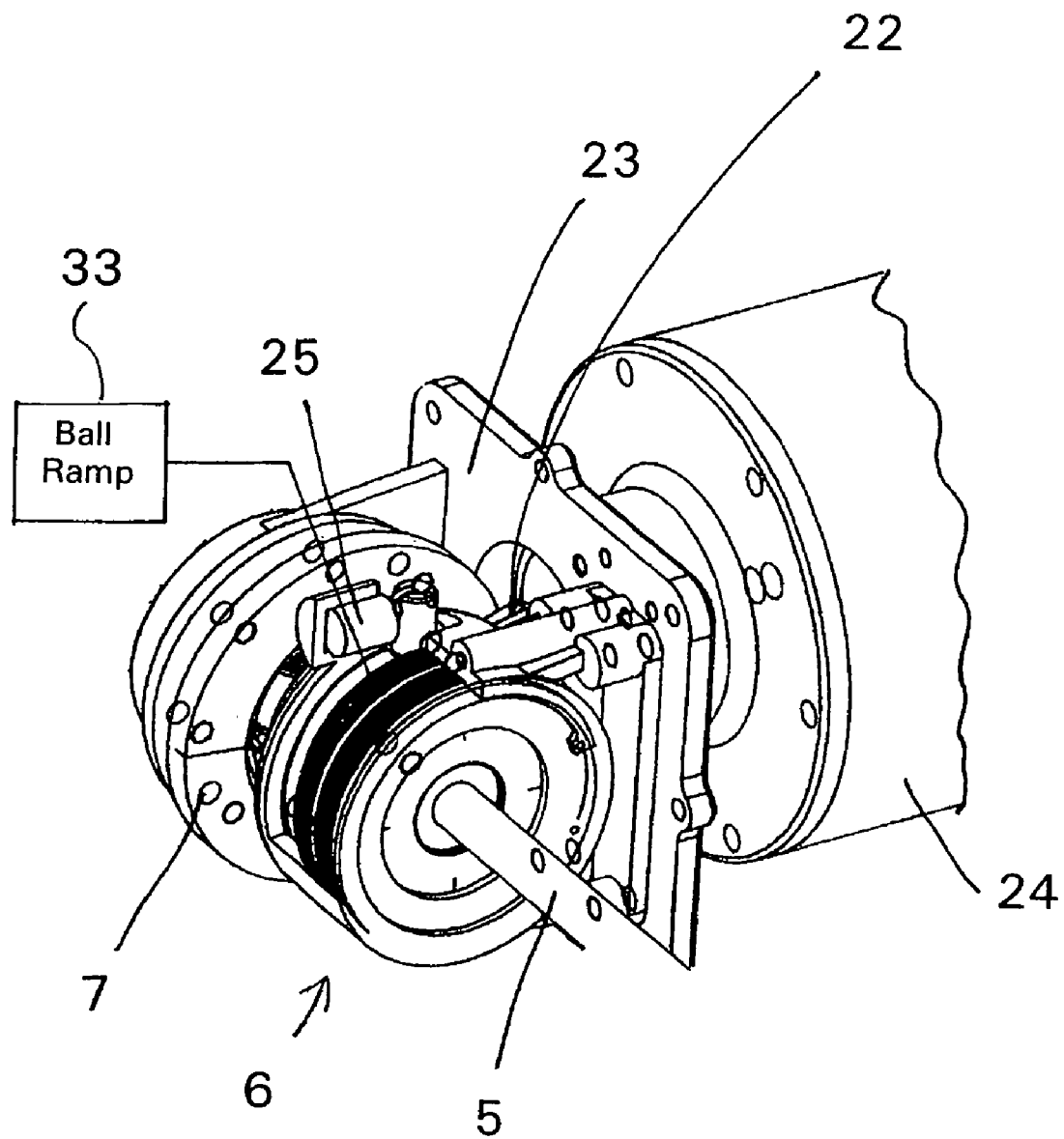
FIG. 3 is a perspective view of the pre-assembled differential with actuation of the brake by a ball ramp

FIG. 3:

The pre-assembled structural unit of the differential on the flange 23, which is connected to an electric motor 24, can be inserted into the differential housing 12 and bolted in place. The brake in FIG. 3 differs from the brakes in FIGS. 1 and 2, in that the brake in FIG. 3 is actuated by a ball ramp 33. The ball ramp 33 has a movable and a rotationally static plate such that the plate that can rotate is actuated by pressurizing a piston 25 with the effect of an operating brake.

REFERENCE NUMERALS

1 ring gear
2 differential cage
3 differential bevel gears
4 drive output bevel gears
5 drive output shafts
6 brake
7 inner disk carrier
8 inner disks
9 neck
10 inner disk carrier
11 inner disks
12 differential housing
13 outer disk carrier
14 outer disks
15 plate
16 piston
17 pressure plate
18 pressure plate
19 locking ring
20 shaft
21 fork
22 drive pinion
23 flange
24 electric motor
25 piston
27 parking brake
29 planet gear
31 wheel
33 ball ramp

The invention claimed is:

1. A differential with a drive pinion (22), which drives a differential cage (2) via a ring gear (1), the ring gear (1) drives axle output shaft gears (4) via differential gears (3), the axle output shaft gears (4) each being connected to a drive output shaft (5), with a disk brake (6) having at least first and second rotating disks (8, 11) and at least one outer static disk (14), such that at least the first rotating disk (8) is connected to the axle output shaft gears (4) and the at least one outer static disk (14) is connected to a differential housing (12), at least the second rotating disk (11) is connected to the differential cage (2) so that, when the brake (6) is engaged, the axle output shaft gears (4) and the differential cage (2) are braked relative to the differential housing (12), and the differential housing (12) has a sufficiently large opening which allows passage of a pre-assembled differential, including the ring gear (1), the differential cage (2), the differential gears (3), the axle output shaft gears (4) and an outer disk carrier (13) for supporting the at least one outer static disk (14), therethrough.

2. The differential according to claim 1, wherein the drive pinion (22) is driven by an electric motor (24) which is arranged at a right angle with respect to the drive output shafts (5).

3. The differential according to claim 1, wherein the brake (6) is arranged coaxially with the drive output shaft (5).

4. The differential according to claim 1, wherein the brake (6) is actuated hydraulically (16), as an operating brake, and one of mechanically (21) or by a spring, as a parking brake.

5. The differential according to claim 1, wherein the brake (6) is actuated as an operating brake by pressurizing at least one actuating piston (16, 25).

6. The differential according to claim 1, wherein the brake (6) is actuated as an operating brake by rotating at least one ball ramp.

7. The differential according to claim 6, wherein the at least one ball ramp is actuated with operating brake effect by a hydraulic cylinder and with parking brake effect by mechanical means, with actuation taking place by one of a spring and a lever.

8. The differential according to claim 1, wherein the brake (6) is actuated, as a parking brake, by a fork-shaped brake lever (21).

9. The differential according to claim 1, wherein a hydraulic actuator (16, 25) is arranged one of between the disks (8, 11, 14) and the ring gear (1) or on the side of the disks (8, 11, 14) facing away from the differential gears (3).

10. The differential according to claim 1, in combination with an electrically powered driving axle such that the drive output shafts (5) each drive a drive output wheel via a planetary gearset.

11. The differential according to claim 1, wherein the first rotating disk (8), the second rotating disk (11) and at least one outer static disk (14) are all sandwiched between a first brake actuating device (16) and a second actuating device (21).

12. The differential according to claim 1, wherein a flange supports the pre-assembled differential, including the brake (6), and the flange seals the sufficiently large opening in the differential housing (12), following assembly of the pre-assembled differential.

13. A differential comprising:
a drive pinion (22) engaging and driving a ring gear (1) coupled to a differential cage (2);
a pair of differential gears (3) for driving a pair of output gears (4) such that the differential cage (2) drives the pair of output gears (4), the differential cage (2) having a first inner disk carrier (10) with at least one second inner disk (11) rotationally fixed thereto;
each of the pair of output gears (4) driving a respective drive shaft (5) and one of the drive shafts (5) having a second inner disk carrier (7) with at least one first inner disk (8) rotationally fixed thereto;
a brake (6) comprising at least one outer static disk (14) carded by an outer disk carrier (13) and the at least one first inner disk (8) and the, at least one second inner disk (11), with the at least one first inner disk (8), the at least one second inner disk (11) and at least one outer static disk (14) all being closely adjacent one another and accommodated by the outer disk carrier (13);
a brake actuator (16) for biasing the at least one first inner disk (8), the at least one second inner disk (11) and at least one outer static disk (14) all into locking engagement with one another to prevent rotation of the drive shafts (5); and a differential housing (12) having a sufficiently large opening which allows passage of a pre-assembled differential, including the ring gear (1), the differential cage (2), the pair of differential gears (3), the pair of output gears and the outer disk carrier (13) and the brake (6), therethrough.

14. The differential according to claim 13, wherein the brake actuator (16) is hydraulically actuated and a second brake actuator (21), functioning as a parking brake, is mechanically actuated.

15. The differential according to claim 13, wherein each of the drive output shafts (5) drives a drive output wheel via a planetary gearset and an electric motor which drives the drive pinion (22).

16. The differential according to claim 13, wherein the first rotating disk (8), the second rotating disk (11) and at least one outer static disk (14) are all sandwiched between a first brake actuating device (16) and a second actuating device (21).

17. The differential according to claim 13, wherein a flange supports the pre-assembled differential and the flange seals the sufficiently large opening in the differential housing (12), following assembly of the pre-assembled differential.

18. A differential comprising:
- a drive pinion (22) engaging and driving a ring gear (1) coupled to a differential cage (2);
- a pair of differential gears (3) for driving a pair of output gears (4) such that the differential cage (2) drives the pair of output gears (4), the differential cage (2) includes a neck (9) having a first inner disk carrier (10) with at least one second inner disk (11) rotationally fixed thereto;
- each of the pair of output gears (4) driving a respective drive shaft (5) and one of the drive shafts (5) having a second inner disk carrier (7) with at least one first inner disk (8) rotationally fixed thereto;
- a brake (6) comprising at least one outer static disk (14) carried by an outer disk carrier (13) and the at least one first inner disk (8) and the at least one second inner disk (11), with the at least one first inner disk (8), the at least one second inner disk (11) and at least one outer static disk (14) all being closely adjacent one another and accommodated by the outer disk carrier (13);
- a first brake actuator (16) for biasing the at least one first inner disk (8), the at least one second inner disk (11) and at least one outer static disk (14) all into locking engagement with one another to prevent rotation of the drive shafts (5);
- a second brake actuator (21) for biasing the at least one first inner disk (8), the at least one second inner disk (11) and at least one outer static disk (14) into locking engagement with one another and prevention rotation of the drive shafts (5), and the second brake actuator (21) being actuated in an opposite direction to an actuating direction of the first brake actuator (16); and
- a differential housing (12) having a sufficiently large opening which allows passage of a pre-assembled differential, including the ring gear (1), the differential cage (2), the pair of differential gears (3), the pair of output gears (4) and the outer disk carrier (13) for supporting the at least one outer static disk (14), therethrough.

19. The differential according to claim 18, wherein the first rotating disk (8), the second rotating disk (11) and at least one outer static disk (14) are all sandwiched between a first brake actuating device (16) and a second actuating device (21).

20. The differential according to claim 18, wherein a flange supports the pre-assembled differential, including the brake (6), and the flange seals the sufficiently large opening in the differential housing (12), following assembly of the pre-assembled differential.

* * * * *